US011163862B2

(12) United States Patent
Barillari et al.

(10) Patent No.: US 11,163,862 B2
(45) Date of Patent: Nov. 2, 2021

(54) AUTHENTICATION OF USERS BASED ON SNAPSHOTS THEREOF TAKEN IN CORRESPONDING ACQUISITION CONDITIONS

(71) Applicant: INTERNATIONAL BUSINESS MACHINES CORPORATION, Armonk, NY (US)

(72) Inventors: Fabio Barillari, Rome (IT); Francesca Curzi, Rome (IT); Stefano Ferrari, Rome (IT); Luca Landi, Rome (IT); Giuseppe Longobardi, Naples (IT); Ugo Madama, Rome (IT); Franco Mossotto, Rome (IT); Riccardo Pizzutilo, Rome (IT); Vincenzo Spinelli, Rome (IT)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 15/981,800

(22) Filed: May 16, 2018

(65) Prior Publication Data

US 2019/0354659 A1 Nov. 21, 2019

(51) Int. Cl.
*G06F 21/32* (2013.01)
*G06F 16/583* (2019.01)
*G06F 16/58* (2019.01)

(52) U.S. Cl.
CPC .......... *G06F 21/32* (2013.01); *G06F 16/5838* (2019.01); *G06F 16/5866* (2019.01)

(58) Field of Classification Search
None
See application file for complete search history.

(56) References Cited

U.S. PATENT DOCUMENTS

| 8,914,848 | B2 | 12/2014 | Castro et al. | |
| 9,147,117 | B1 | 9/2015 | Madhu et al. | |
| 9,230,077 | B2 | 1/2016 | Markwordt et al. | |
| 2010/0293600 | A1* | 11/2010 | Schechter | G06F 21/31 726/4 |

(Continued)

FOREIGN PATENT DOCUMENTS

| WO | 2005045550 A2 | 5/2005 |
| WO | 2016033698 A1 | 3/2016 |

OTHER PUBLICATIONS

Alkhattabi, "On Community-Based Authentication Factor," University of Colorado Thesis, Fall 2015, p. 1-108.

(Continued)

*Primary Examiner* — Taghi T Arani
*Assistant Examiner* — Joshua Raymond White
(74) *Attorney, Agent, or Firm* — Alexis N. Hatzis

(57) ABSTRACT

A method, computer system, and a computer program product for authenticating a user in a computing system is provided. A corresponding method comprises validating one or more user snapshots of the user that should have been acquired in corresponding acquisition conditions according to their match with the corresponding acquisition conditions; the user snapshots are then sent (at least in part) to one or more authenticators requesting them to identify the user. A computer program and a computer program product for performing the method are also proposed. Moreover, a corresponding system is proposed.

17 Claims, 8 Drawing Sheets

(56) References Cited

U.S. PATENT DOCUMENTS

| | | | |
|---|---|---|---|
| 2012/0166553 A1 | 6/2012 | Rubinstein et al. | |
| 2013/0073974 A1* | 3/2013 | Bladel | G06Q 50/265 |
| | | | 715/739 |
| 2013/0263231 A1* | 10/2013 | Lautenschlager | H04L 63/18 |
| | | | 726/4 |
| 2014/0072170 A1* | 3/2014 | Zhang | G06K 9/00785 |
| | | | 382/103 |
| 2014/0109208 A1 | 4/2014 | Song | |
| 2014/0150071 A1 | 5/2014 | Castro et al. | |
| 2014/0189808 A1 | 7/2014 | Mahaffey et al. | |
| 2014/0310764 A1* | 10/2014 | Tippett | G06F 21/31 |
| | | | 726/1 |
| 2015/0089568 A1* | 3/2015 | Sprague | H04L 63/06 |
| | | | 726/1 |
| 2015/0128240 A1 | 5/2015 | Richards et al. | |
| 2017/0017859 A1* | 1/2017 | Uchiyama | G06K 9/6292 |
| 2017/0124385 A1* | 5/2017 | Ganong | G06F 16/50 |
| 2018/0191501 A1* | 7/2018 | Lindemann | G06F 3/0647 |
| 2018/0225665 A1* | 8/2018 | Lee | G06Q 20/3223 |
| 2018/0357870 A1* | 12/2018 | Siminoff | G08B 13/19606 |
| 2019/0034605 A1* | 1/2019 | Wang | G06F 21/32 |
| 2019/0188366 A1* | 6/2019 | Inoue | H04L 9/32 |

OTHER PUBLICATIONS

Brainard et al., "A New Two-Server Approach for Authentication with Short Secrets," Proceedings of the 12th USENIX Security Symposium, Aug. 4-8, 2003, p. 201-213, USENIX Association, Washington, D.C., USA.

Pontz, "Password Security Questions Remain Problematic," From the Grapevine, May 22, 2015, p. 1-2, https://www.fromthegrapevine.com/innovation/password-security-questions-remain-problematic, Accessed on May 14, 2018.

* cited by examiner

AUTHENTICATION OF USERS BASED ON SNAPSHOTS THEREOF TAKEN IN CORRESPONDING ACQUISITION CONDITIONS

BACKGROUND

The present disclosure relates to the information technology field. More specifically, this disclosure relates to the authentication of users in computing systems.

The background of the present disclosure is hereinafter introduced with the discussion of techniques relating to context. However, even when this discussion refers to documents, acts, artifacts and the like, there is no suggestion or representation that the discussed techniques are part of the prior art, or are common general knowledge in the field relevant to the present disclosure.

The authentication of users is a commonplace activity in computing systems for confirm their identity. In this way, there is a possibility of preventing unauthorized users from performing undesired (and generally dangerous) activities on the computing systems. For example, the authentication of users may be required to grant access to hardware/software resources, to approve transactions, to reset passwords. The need of authenticating the users is particularly acute in modern computing systems with distributed architecture (typically based on the Internet), which computing systems are open and then potentially allow an uncontrolled access thereto.

Several (authentication) techniques may be used to authenticate the users. The authentication techniques are based on different (authentication) factors; particularly, the authentication factors may be knowledge factors (i.e., information that the users know, like usernames and passwords, challenge questions), possession factors (i.e., information based on items that the users possess, like smartphones, security tokens) and inherence factors (i.e., information based on features inherent of the users, like retinal scans, fingerprint patterns). Moreover, authentication techniques based on multiple factors may be used to enhance security (e.g., requiring a user to enter a username and password and to enter a code sent by SMS to the user's smartphone).

However, the authentication techniques mentioned above are not completely reliable (e.g., knowledge factors may be stolen, possession factors may be replicated and inherence factors may be intercepted). Moreover, the authentication techniques may be inconvenient (e.g., when they require dedicated hardware devices). In any case, knowledge factors may be forgotten, possession factors may be lost and inherence factors may be compromised. A typical scenario is when a user does not remember the user's password (occurring more and more often with the increasing number of personal accounts that the user owns with corresponding services in the Internet). In this case, the user is generally allowed to reset the password. For this purpose, the user may be requested to answer secret questions, to provide personal information, to perform an escalation. However, the answers to the secret questions may be forgotten as well, the personal information may be publicly available, and the escalation may be difficult or even impossible (since the user does not know which person to contact or because this person is temporarily unavailable).

The authentication techniques may also be based on social factors. In this case, individuals (authenticators) associated with the user in social networks (e.g., friends, colleagues) are contacted for authenticating the user. Particularly, representations of the user are sent to the authenticators asking them to confirm the identity of the user.

The representations of the user may be snapshots (e.g., informal photographs taken quickly) thereof that have been acquired and saved in advance or that are acquired in real time. However, in this case, fake snapshots may be used to misrepresent the user.

Alternatively, the representations of the user may be videos that are acquired in real time to avoid any misrepresentation of the user. However, the management of the videos involves a high consumption of hardware/software resources (e.g., computational power and working/mass memory space in corresponding computing devices of the user/authenticators, network traffic between them), which may adversely affect the quality of the videos, and then the effectiveness of the authentication (e.g., when not enough bandwidth or signal strength is available to provide a smooth and continuous streaming of the videos).

SUMMARY

A simplified summary of the present disclosure is herein presented to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of taking snapshots in different acquisition conditions.

Particularly, an aspect provides a method for authenticating a user in a computing system. The method comprises validating one or more snapshots of the user (i.e., user snapshots) that should have been acquired in corresponding acquisition conditions according to their match with the acquisition conditions. The user snapshots are then sent (at least in part) to one or more authenticators requesting them to identify the user.

A further aspect provides a computer program for implementing the method.

A further aspect provides a computer program product for implementing the method.

A further aspect provides a corresponding system.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art understanding the invention in conjunction with the detailed description. In the drawings.

DETAILED DESCRIPTION

With reference in particular to FIG. 1A-FIG. 1D, the general principles are shown of the solution according to an embodiment of the present disclosure.

Figure 1A:
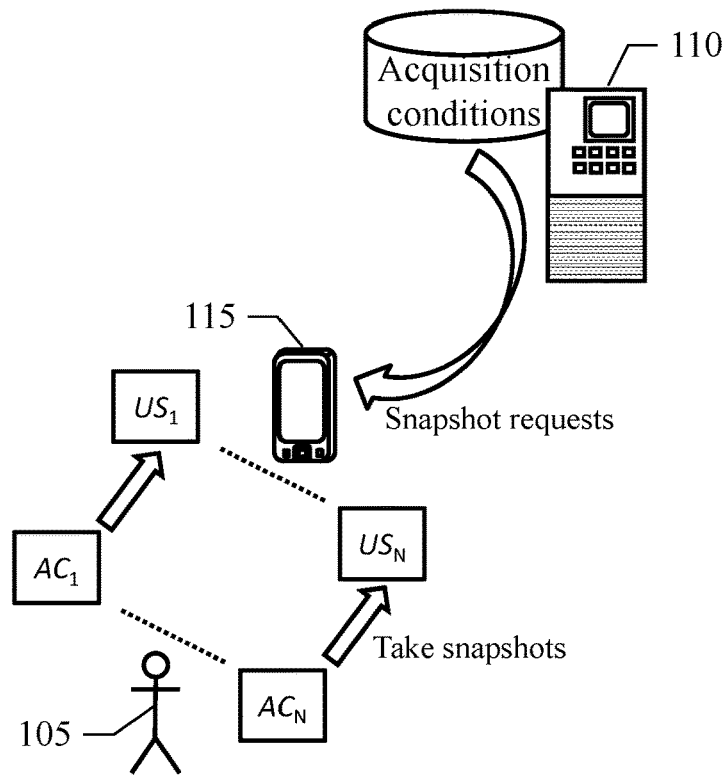
FIG. 1A-FIG. 1D show the general principles of the solution according to an embodiment of the present disclosure.

Starting from FIG. 1A, authentication of a user 105 (to confirm the user's identity) is may be utilized in a computing system, for example, a server computing machine or simply server 110. For example, the user 105 owns a personal account with a service offered in the Internet (e.g., a home-banking service), which personal account may be accessed via a username assigned to the user 105 and a password chosen by the user. The user 105 may have forgotten the password for accessing the personal account; therefore, the user 105 may submit a request (i.e., snapshot request) for resetting the password to the server 110 (by specifying the username). In this condition, the server 110 may send one or more snapshot requests to a user computing device associated with the user thereof, for example, a smartphone 115; the snapshot requests may be for one or more user snapshots $US_i$ (with i=1 . . . N) of the user 105.

In the solution according to an embodiment of the present disclosure, the snapshot requests may indicate that the user snapshots USS are to be taken (in real time) in corresponding acquisition conditions $AC_i$ that are not known a priori to the user 105 (for example, selected in pseudo-random way among different poses, expressions and/or backgrounds). In response thereto, the user 105 may follow the acquisition conditions $AC_i$ and then may take the corresponding user snapshots $US_i$ with the smartphone 115.

Figure 1B:
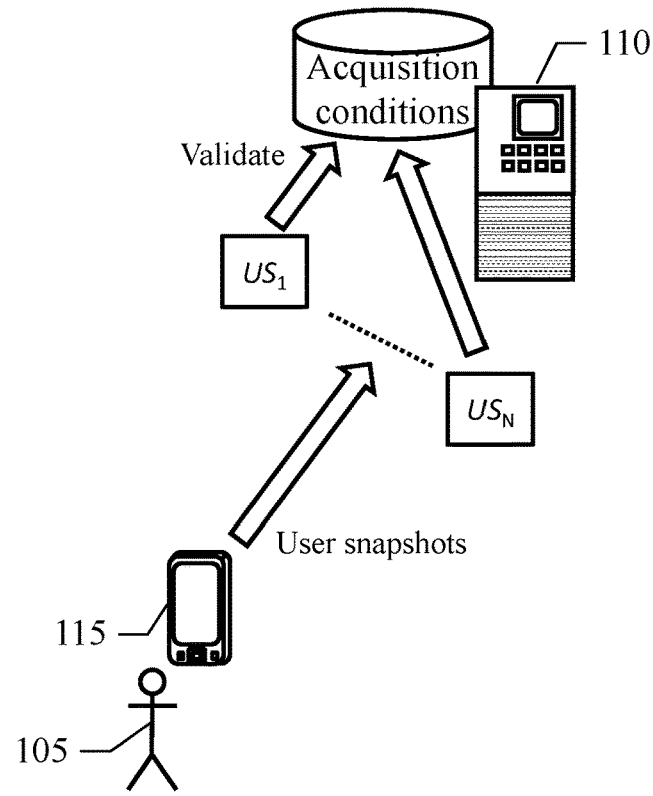

Moving to FIG. 1B, the server 110 may receive the user snapshots $US_i$ that are sent thereto from the smartphone 115. The user snapshots $US_i$ may be validated according to their match with the corresponding acquisition conditions $AC_i$ (i.e., by verifying whether in each user snapshot $US_i$ the user 105 actually has the pose, expression and/or background indicated in the acquisition condition $AC_i$).

Figure 1C:
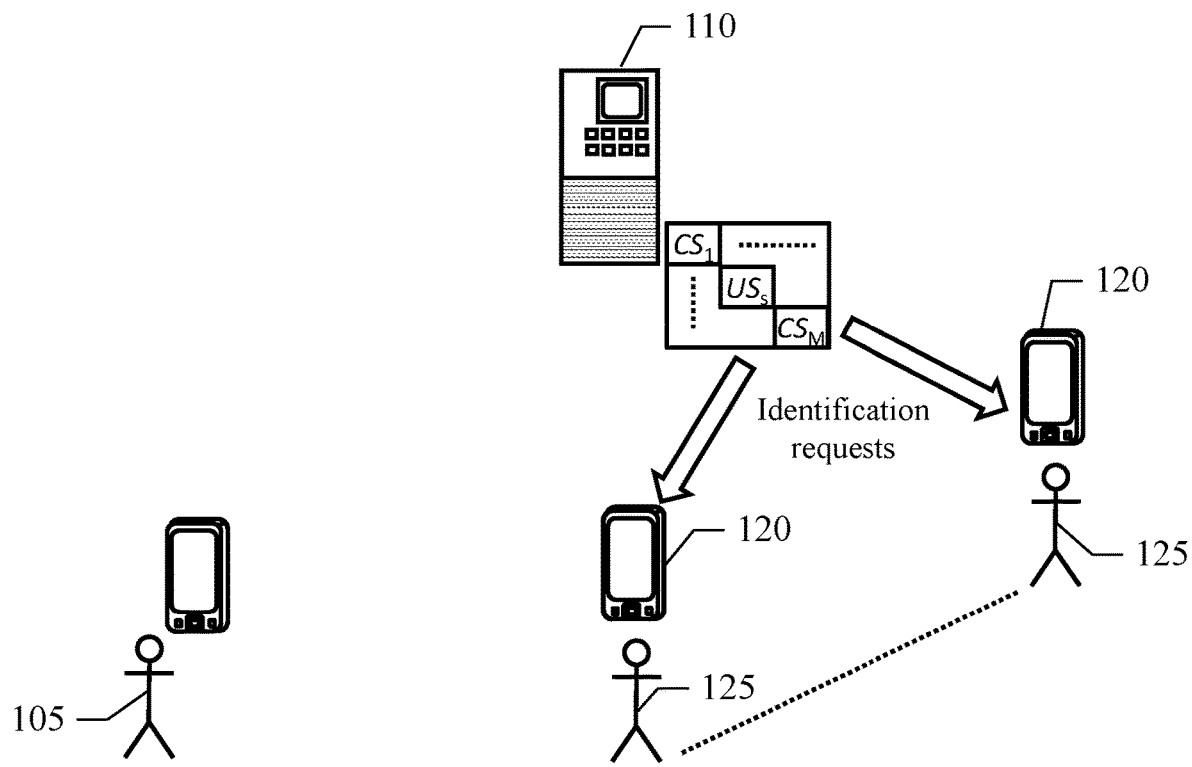

Moving to FIG. 1C, if the user snapshots $US_i$ have been correctly validated, the server 110 may send corresponding identification requests for identifying the user 105 to corresponding (authenticator) computing devices, for example, smartphones 120 of one or more authenticators 125 (e.g., selected in a roster of persons having an affinity with the user 105, like friends, colleagues thereof). The identification requests may be based on at least part of the user snapshots $US_i$ (e.g., asking the authenticators 125 to identify the user 105 within a group of challenge snapshots comprising a selected user snapshot $US_i$ and a plurality of comparison snapshots $CS$, (with j=1 . . . M) of other persons).

Figure 1D:
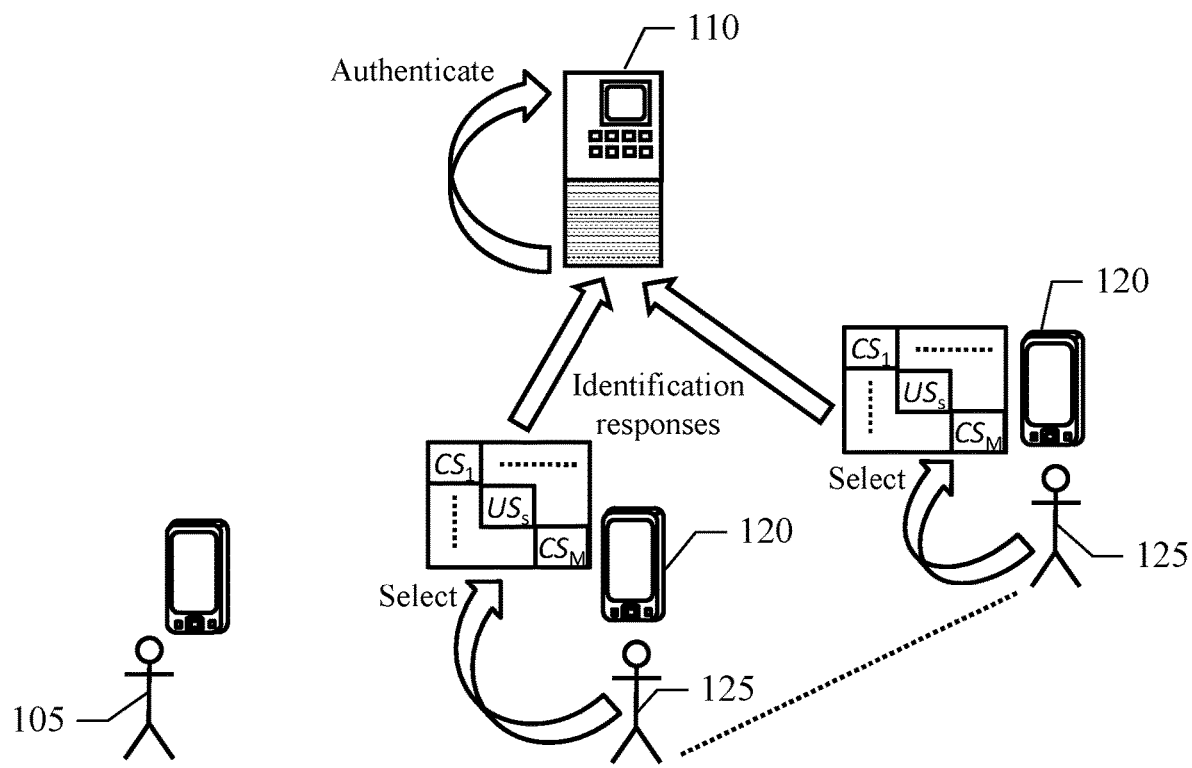

Moving to FIG. 1D, the server 110 may receive corresponding identification responses that are sent thereto from the smartphones 120 in response to the identification requests (e.g., each one indicating the challenge snapshot that has been selected by the corresponding authenticator). The server 110 may authenticate the user according to these identification responses (e.g., by confirming the identity of the user 105 when all the authenticators have correctly selected the user snapshot within the challenge snapshots). In this case, the server 110 may allow the user 105 to perform the activities the user is authorized to do (e.g., resetting the password in the example at issue).

The above-described solution may be very reliable; indeed, the taking of the user snapshots in real-time (every time the user has to be authenticated) with acquisition conditions that are not known a priori may prevent the use of fake snapshots to misrepresent the user.

At the same time, this result may be achieved with limited consumption of hardware/software resources (e.g., computational power and working/mass memory space in the smartphones and the server, network traffic between them).

As a result, the quality of the user snapshots may be maintained sufficiently high, with a beneficial effect on the effectiveness of the authentication of the user.

Figure 2:
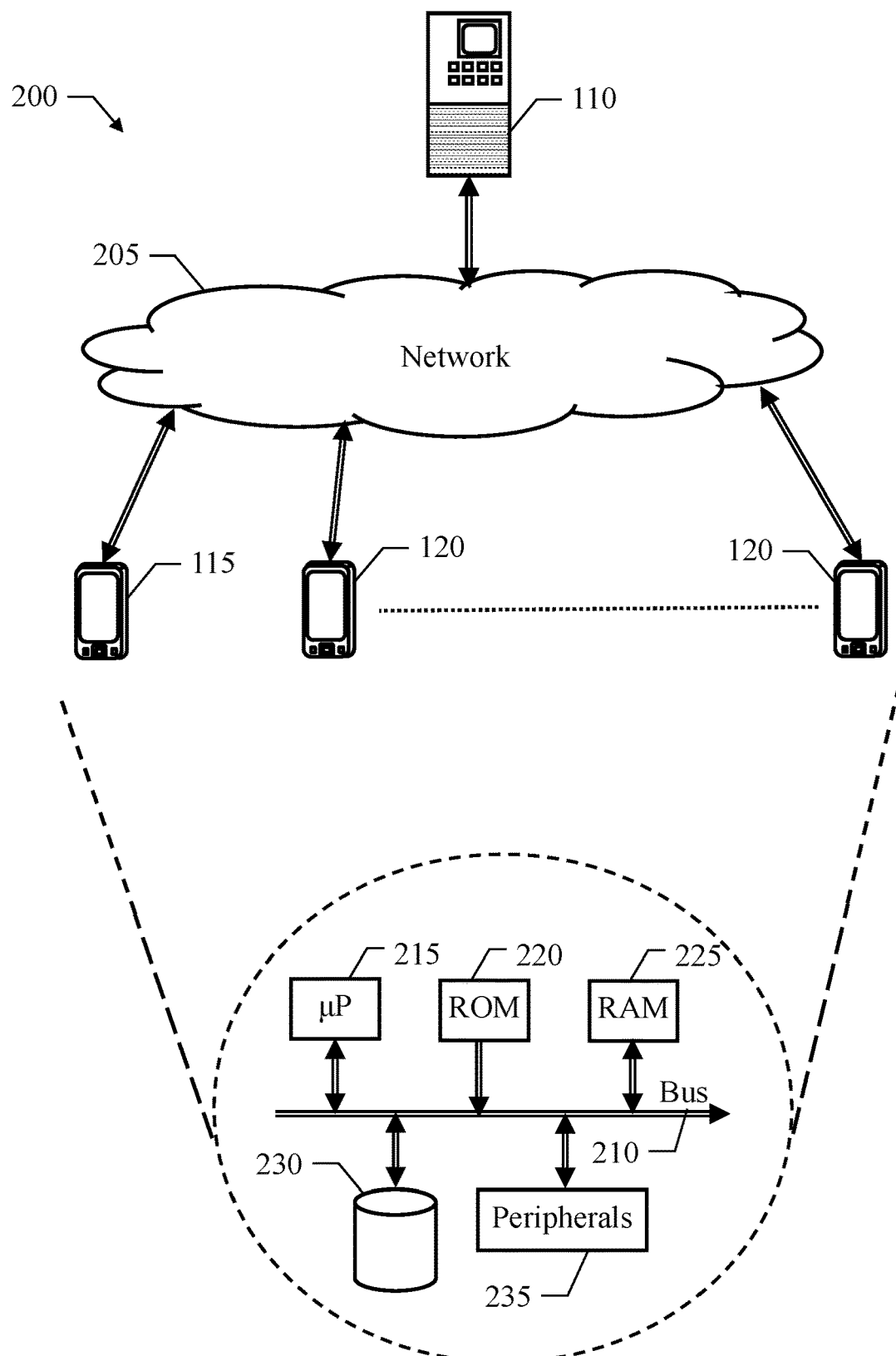
FIG. 2 shows a schematic block diagram of a computing infrastructure wherein the solution according to an embodiment of the present disclosure may be practiced.

With reference now to FIG. 2, a schematic block diagram is shown of a computing infrastructure 200 wherein the solution according to an embodiment of the present disclosure may be practiced.

The computing infrastructure 200 may comprise the server 110, the smartphone 115 (of each user) and the smartphones 120 (of the authenticators). The server 110 and the smartphones 115, 120 may communicate among them via a communication network 205 (e.g., of global type based on the Internet).

Each of the above-mentioned computing machines (server 110 and smartphones 115, 120) may comprise several units that are connected among them through a bus structure 210 with one or more levels (with an architecture that is suitably scaled according to the type of the computing machine 110-120). Particularly, one or more microprocessors (μP) 215 may control operation of the computing machine 110-120; a non-volatile memory (ROM) 220 may store a basic code for a bootstrap of the computing machine 110-120 and a volatile memory (RAM) 225 may be used as a working memory by the microprocessors 215. The computing machine 110-120 may be provided with a mass-memory 230 for storing programs and data (e.g., storage devices of a data center wherein the server 110 is implemented and flash $E^2PROMs$ for the smartphones 115-120). Moreover, the computing machine 110-120 may comprise a number of controllers for peripherals, or Input/Output (I/O) units, 235; for example, the peripherals 235 of the server 110 comprise a network adapter for plugging the server 110 into the data center and then connecting it to a console of the data center (e.g., a personal computer, also provided with a drive for reading/writing removable storage units, such as optical disks like DVDs) and to a switch/router sub-system of the data center for its communication with the (communication) network 205, whereas the peripherals 235 of each smartphone 115-120 may comprise a mobile telephone transceiver (TX/RX) for communicating with a mobile network and a network adapter (WNIC) of the Wi-Fi type for communicating with access points (and then with the network 205), a touch-screen for displaying information and entering commands, a (still) camera for acquiring snapshots and a GPS receiver for detecting a position of the smartphone 115-120.

Figure 3:
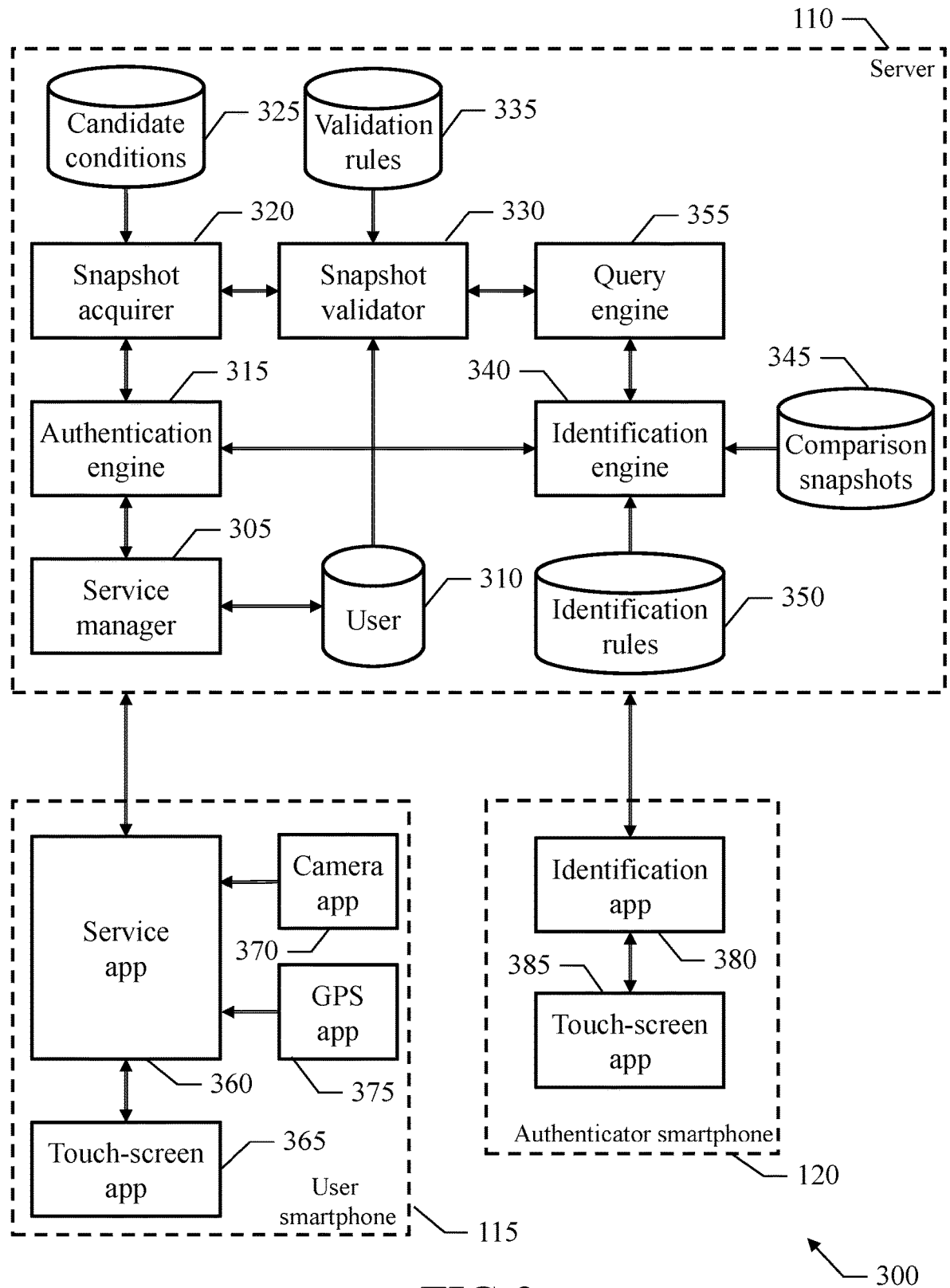
FIG. 3 shows the main software components that may be used to implement the solution according to an embodiment of the present disclosure.
Figure 4A:
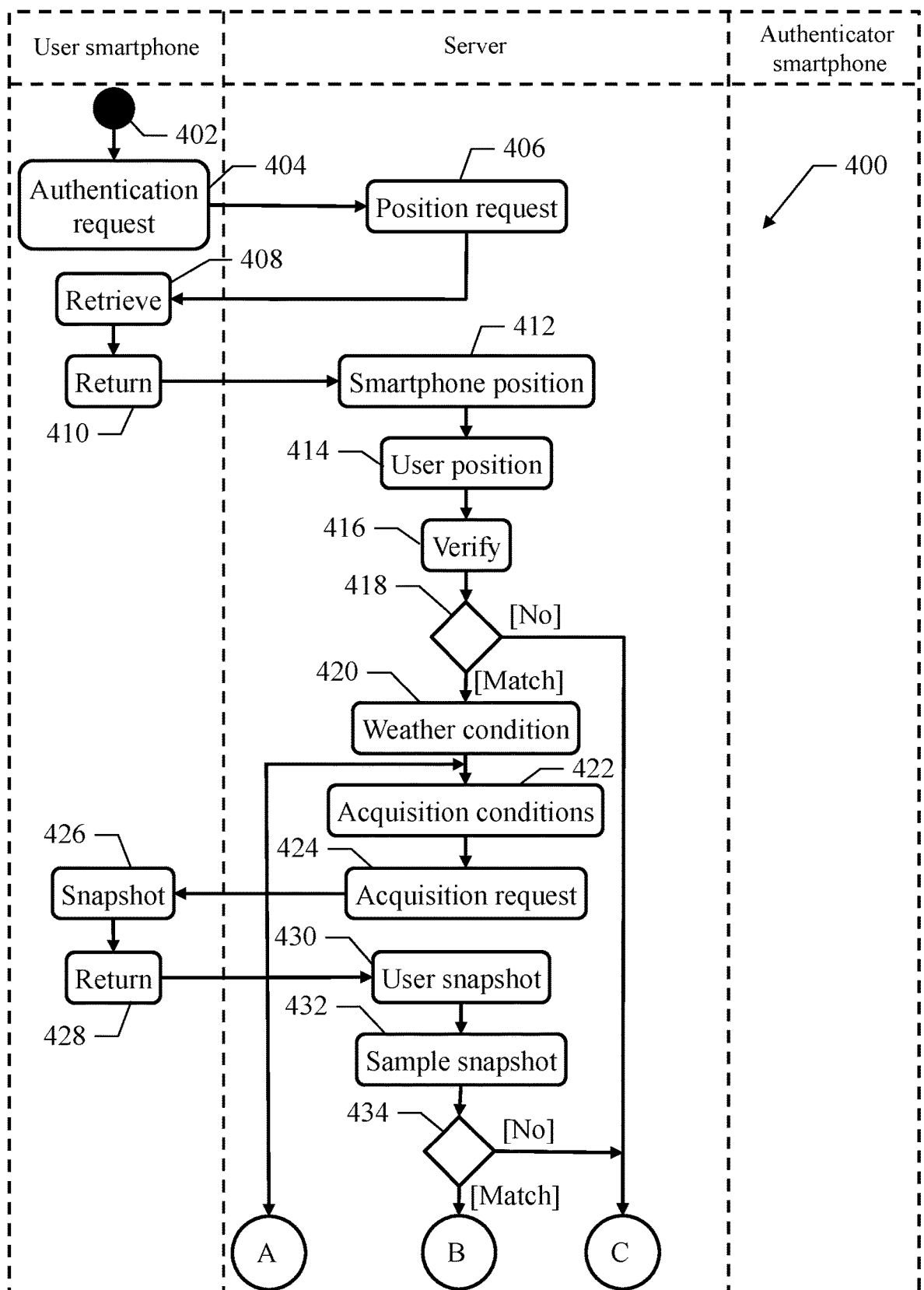
FIG. 4A-FIG. 4D show an activity diagram describing the flow of activities relating to an implementation of the solution according to an embodiment of the present disclosure.
Figure 4B:
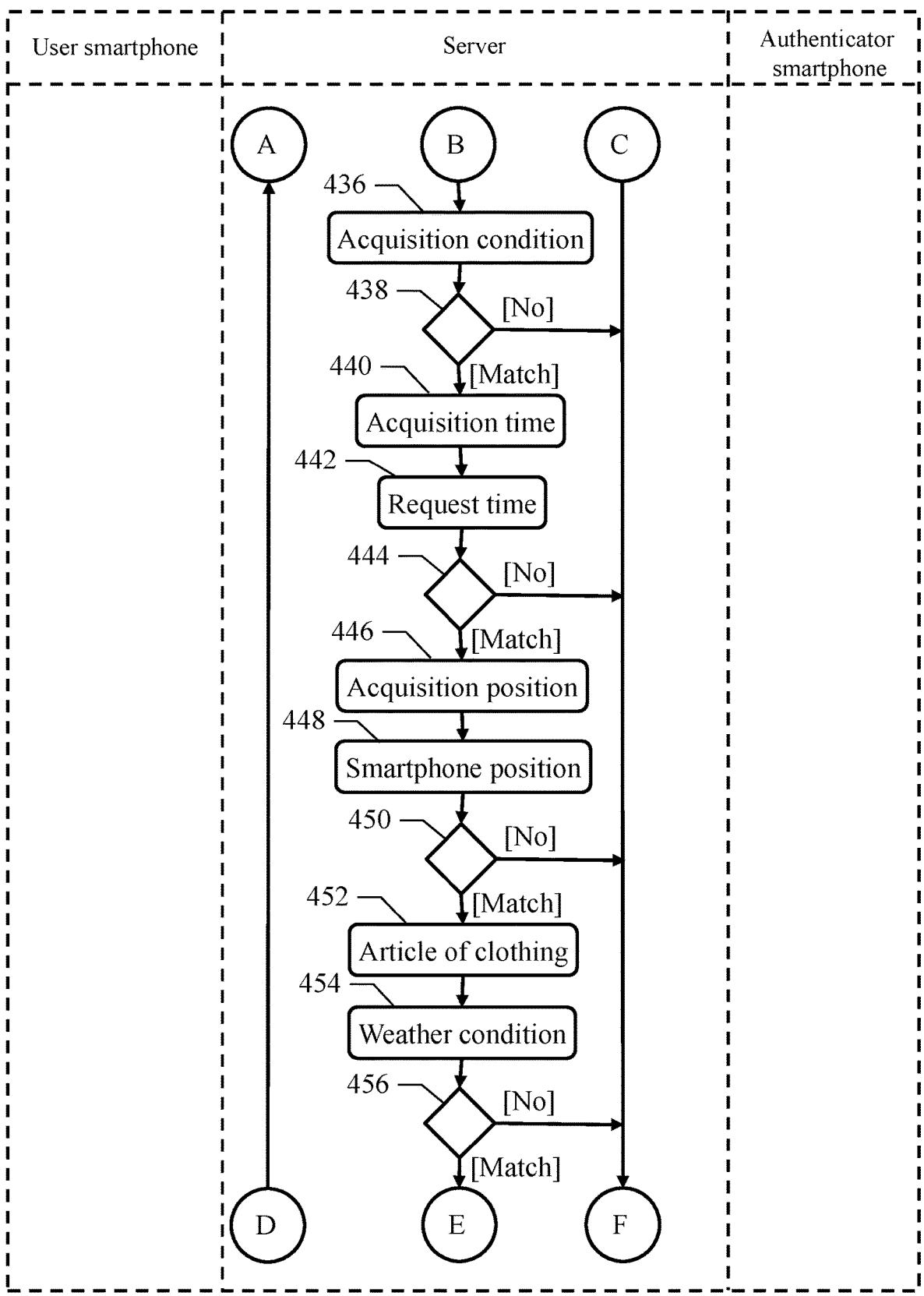
Figure 4C:
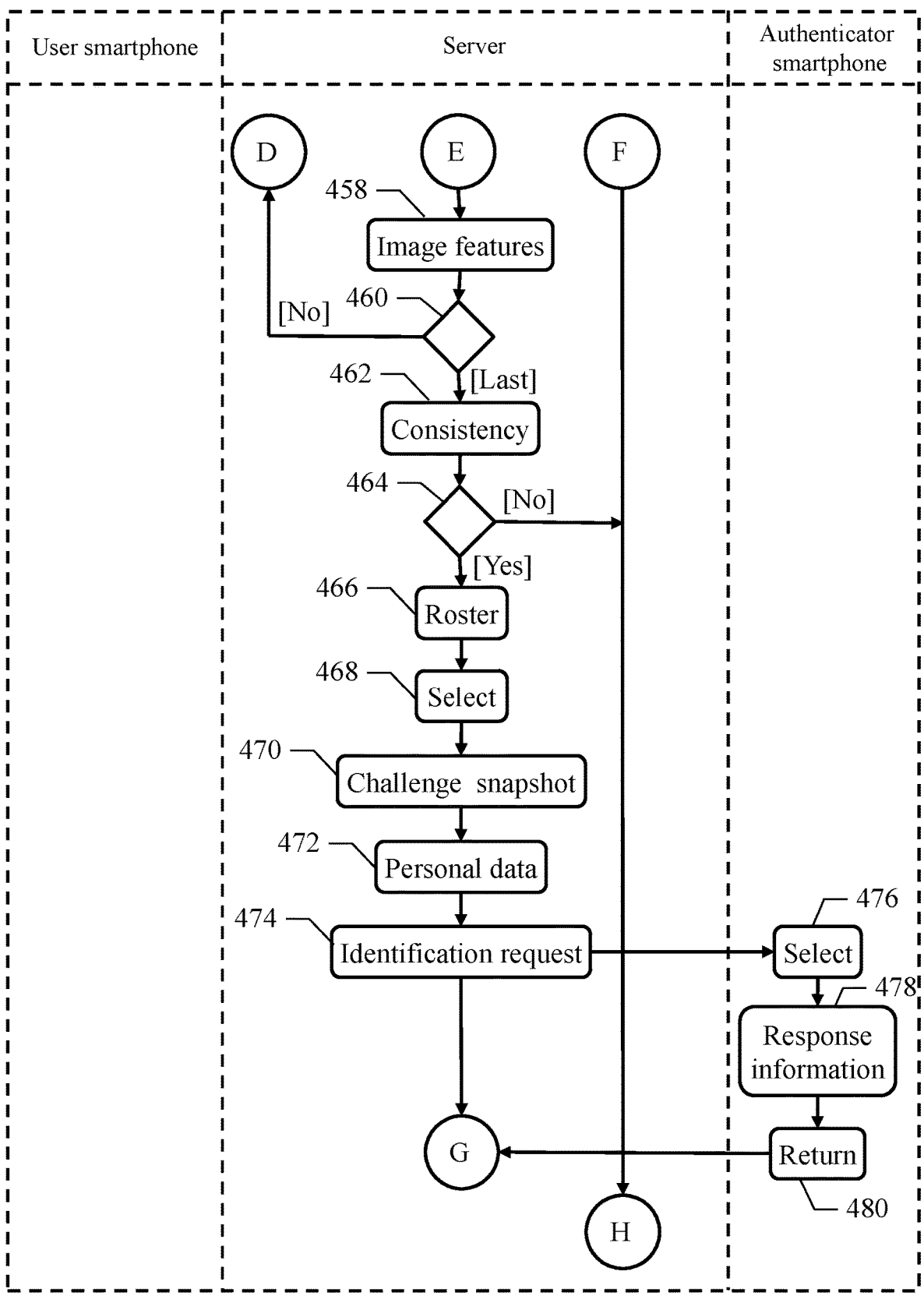
Figure 4D:
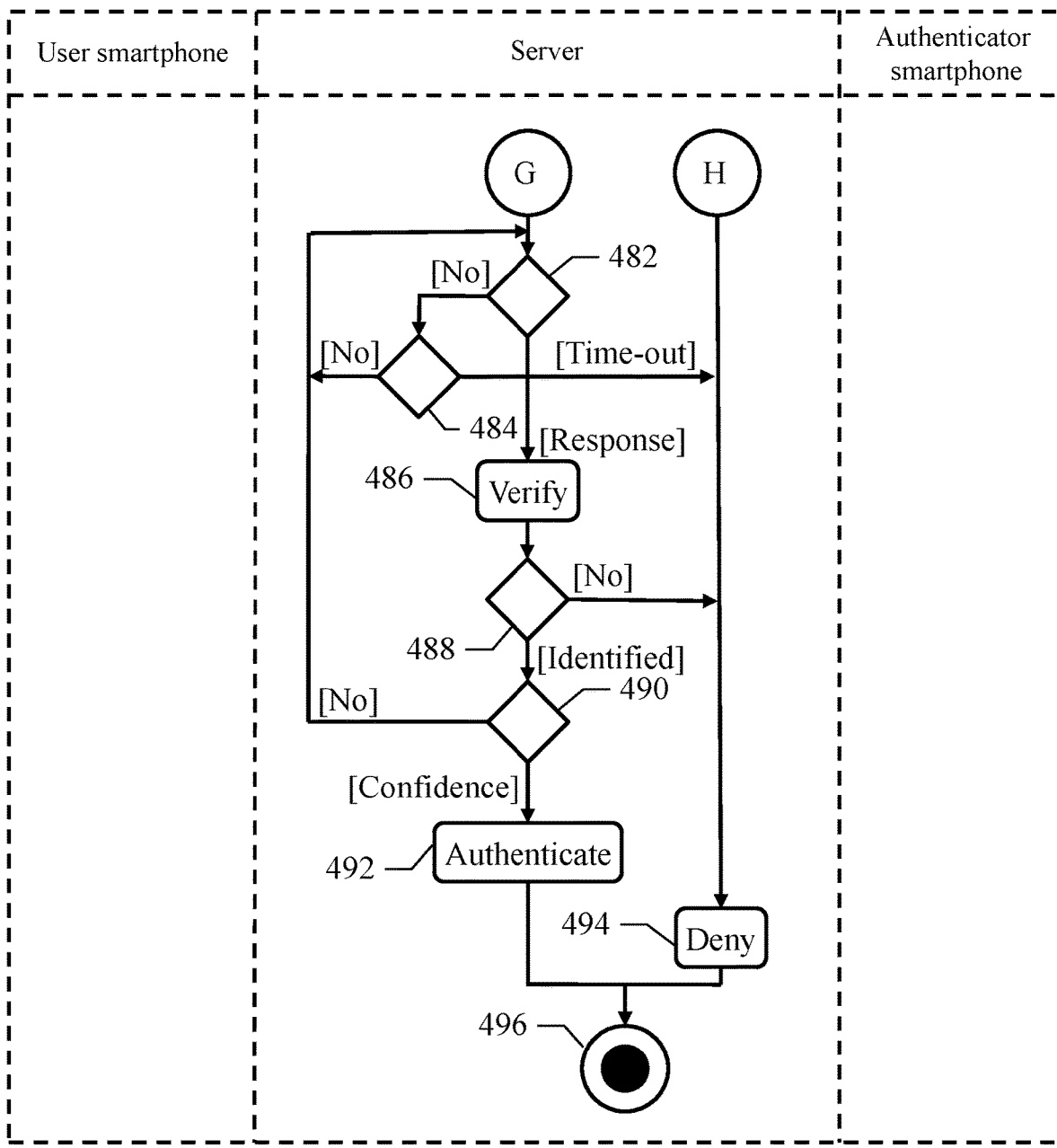

With reference now to FIG. 3, the main software components are shown that may be used to implement the solution according to an embodiment of the present disclosure.

Particularly, all the software components (programs and data) may be denoted as a whole with the reference 300. The software components may typically be stored in the mass memory and loaded (at least in part) into the working memory of the server 110 and the smartphones 115-120 when the programs are running, together with an operating system and other application programs (not shown in the figure). The programs may be initially installed into the mass memory, for example, from removable storage units or from the network. In this respect, each program may be a module, segment or portion of code, which comprises one or more executable instructions for implementing the specified logical function.

Starting from the server 110, there may comprise the following software components. A service manager 305 (e.g., of web type), which may offer a corresponding service to users accessing the server 110 with their smartphones 115; for example, the service manager 305 provides services relating to home-banking, e-commerce, software development, procurement, marketing, project management, and the like. The service manager 305 may access (in read/write mode) a user repository 310, which stores information relating to the users that are authorized to access the service manager 305; particularly, for each user the repository 310 comprises the user's username, password, a sample snapshot (or more), and reference information defined by the values of one or more personal data (like first name, surname, date of birth, mother's name, father's name, job, hobbies, and the like) that have been provided during a registration of the user with the service manager 305 and possibly updated later on.

The service manager 305 may exploit an authentication engine 315, which authenticates each user when it is necessary (e.g., when the user requests the registration with the service manager 305, needs to reset the password, and the like). The authentication engine 315 may exploit a snapshot acquirer 320, which acquires the user snapshots of the user to be authenticated. The snapshot acquirer 320 may access (in read mode) a candidate condition repository 325, which stores a plurality of candidate conditions among which the acquisition conditions of the user snapshots are selected. For example, the candidate conditions are different poses, expressions, backgrounds and the like; the poses may be front, left side and right side, the expressions may be smile and blink, and the backgrounds may be buildings, trees and sky. The snapshot acquirer 320 may exploit a snapshot validator 330, which validates the user snapshots that have been acquired. The snapshot validator 330 may access (in read mode) a validation rule repository 335, which stores one or more validation rules to be used for validating the user snapshots; for example, the validation rules indicate one or more social networks to be used to determine a (user) position of each user to be validated, one or more meteorological services to be used to retrieve one or more weather parameters (e.g., temperature) defining a weather condition, a list of articles of clothing that may be worn on one or more body-parts of the user (e.g., his/her trunk, like t-shirt, shirt, jumper, jacket) together with corresponding temperature ranges at which they are normally worn, a list of image features (e.g., type and color of articles of clothing) to be verified for consistency among the user snapshots. The authentication engine 315 may further exploit an identification engine 340, which verifies the identity of each user to be authenticated. The identification engine 340 may access (in read mode) a comparison snapshot repository 345, which stores comparison snapshots of other persons (different from the user to be authenticated); for example, the comparison snapshots is extracted from the sample snapshots in the user repository 310 or more generally are pre-loaded or retrieved from the network. Moreover, the identification engine 340 may access (in read mode) an identification rule repository 350, which stores one or more identification rules to be used for identifying the users; for example, the identification rules indicate one or more social networks and selection criteria to be used for determining the authenticators. Both the snapshot validator 330 and the identification engine 340 may exploit a query engine 355, which is used to access different services that are available in the network, comprised the above-mentioned social networks and meteorological services. In general, the social networks may be used to share information among persons having similar interests, activities or connections (e.g., for maintaining contacts, building relations or exchanging information), such as chat rooms, live helps, forums. The meteorological services may provide current weather conditions and weather forecasts for corresponding locations.

Moving to the smartphone 115 of each user to be authenticated (only one shown in the figure), there may comprise the following software components.

A service mobile application, or simply service app, 360 may be used to interact with the server 110; as far as relevant to the present disclosure, the service app 360 may be used to request the authentication of the user of the smartphone 115 when it is necessary. The service app 360 may exploit a touch-screen app 365 controlling the touch-screen (for displaying information and entering commands), a camera app 370 controlling the camera (for acquiring the user snapshots) and a GPS app 375 controlling the GPS receiver (for detecting the position of the smartphone 115).

Moving to the smartphone 120 of each authenticator (only one shown in the figure), there may comprise the following software components.

An identification app 380 may be used to interact with the server 110 for identifying each user to be authenticated. The identification app 380 may exploit a similar touch-screen app 385 controlling the touch-screen as above.

With reference now to FIG. 4A-FIG. 4D, an activity diagram may be shown describing the flow of activities relating to an implementation of the solution according to an embodiment of the present disclosure.

Particularly, the diagram represents an exemplary process that may be used to authenticate a generic user with a method 400. In this respect, each block may correspond to one or more executable instructions for implementing the specified logical function on the server.

The process may begin at the start block 402 and then may pass to block 404 in the swim-lane of the smartphone of the user when s/he needs to be authenticated; for example, this happens when the user enters a request for resetting his/her password in the service app or when the user starts registering with the service manager. In any case, the service app may submit an identification request for the user (indicated by the username entered manually or stored in the smartphone of the user in association with the service app) to the service manager.

Moving to the swim-lane of the server, in response thereto the service manager at block 406 commands the authentication engine to authenticate the user; for this purpose, the snapshot acquirer submits a position request to the service app of the smartphone of the user for obtaining its (device) position.

Returning to the swim-lane of the smartphone of the user, in response thereto the service app at block 408 may measure the device position (e.g., defined by its GPS coordinates) by means of the GPS app. The service app at block 410 may return the device position to the snapshot acquirer.

With reference again to the swim-lane of the server, the snapshot acquirer at block 412 may save the device position (received from the service app) into a corresponding working variable. Continuing to block 414, the snapshot validator may command the query engine to retrieve the (user) position where the user is supposed to be at the moment. For this purpose, the query engine may submit corresponding requests to the social networks indicated in the validation rule repository, so as to receive the user position from each of these social networks wherein the user is registered and possibly currently logged-in. Assuming that a significant value of the user position has been retrieved (i.e., the query engine retrieved at least one value thereof from the social networks and the retrieved values of the user position are coherent, such as with their linear difference that is, possibly strictly, lower that a threshold value, like 1-10 Km), the validator at block 416 may verify the device position (retrieved from the corresponding working variable) against the user position (received from the social networks). The flow of activity branches at block 418 according to a result of this verification.

If the device position matches the user position (e.g., their linear distance is, possibly strictly, lower than a threshold value, like 1-10 Km), then the smartphone may actually be held by the user and then the authentication request has been submitted by the user; in this case, the snapshot validator at block 420 may command the query engine to retrieve the weather condition at the device position. For this purpose, the query engine may submit corresponding requests for the weather parameters (e.g., temperature) to the meteorological services indicated in the validation rule repository (with the actual value of the temperature at the device position that is then defined by the median of the values thereof received from the different meteorological services). Continuing to bock 422, the snapshot acquirer may select a pre-determined number of acquisition conditions (e.g., 2-5); the acquisition conditions may be selected in pseudo-random way among the candidate conditions stored in the corresponding repository.

A loop may now be entered for acquiring the user snapshots corresponding to the acquisition conditions that have been selected. The loop begins at block 424, wherein the snapshot acquirer sends a snapshot request to the smartphone of the user for obtaining a corresponding user snapshot; the snapshot request may comprise an indication of a (current) one of the acquisition conditions (starting from a first one in any arbitrary order). At the same time, the snapshot acquirer may save a current (request) time (provided by a system clock) into a corresponding working variable. Moving to the swim-lane of the smartphone of the user, in response thereto the service app at block 426 may command the touch-screen app to display a message (e.g., a notification) asking the user a permission to take the user snapshot in the acquisition condition. Assuming that the user has granted the permission, the service app may automatically open the camera app so as to allow the user to take the required user snapshot; the user snapshot may be tagged with an indication of the current (acquisition) time (provided by a system clock) and of the (acquisition) position of the smartphone of the user (provided by the GPS app). The service app at block 428 may return the user snapshot so tagged to the snapshot acquirer. With reference again to the swim-lane of the server, the snapshot acquirer at block 430 may save the user snapshot (received from the service app) into a corresponding working variable. Continuing to block 432, the snapshot validator may verify the user snapshot against the sample snapshot of the user (retrieved from the user repository), for example, with cognitive techniques. The flow of activity branches at 434 according to a result of this verification.

If the user snapshot matches the sample snapshot, then the user snapshot may actually be of the user and the user may actually be the person to be authenticated; in this case, the snapshot validator at block 436 may verify the user snapshot against the corresponding acquisition condition, for example, with cognitive techniques. The flow of activity branches at block 438 according to a result of this verification. If the user snapshot matches the acquisition condition, then the user snapshot may actually have been taken in the acquisition condition indicated in the snapshot request and may likely be authentic; in this case, the snapshot validator at block 440 may extract the acquisition time from the corresponding tag of the user snapshot. The validator at block 442 may verify the acquisition time against the request time (extracted from the corresponding working variable). The flow of activity branches at 444 according to a result of this verification. If the acquisition time follows the request time, the user snapshot may actually have been taken in response to the snapshot request and may likely be authentic; in this case, the snapshot validator at block 446 may extract the acquisition position from the corresponding tag of the user snapshot. The validator at block 448 may verify the acquisition position against the device position (extracted from the corresponding working variable). The flow of activity branches at 450 according to a result of this verification. If the acquisition position matches the device position (e.g., their linear distance is, possibly strictly, lower than a threshold value, like 10-20 Km to take into account a possible movement of the user in the meanwhile), the user snapshot may have been actually taken where the smartphone of the user is and may likely be authentic; in this case, the snapshot validator at block 452 may determine the article of clothing (among the ones that may cover the body-part indicated in the validation rule repository) that is worn by the user from the user snapshot, for example, with cognitive techniques. The snapshot validator at block 454 may verify the article of clothing against the weather condition at the device position (extracted from the corresponding working variable). For this purpose, the validator may verify whether the temperature at the device position falls within the temperature range of the article of clothing (indicated in the validation rule repository). The flow of activity branches at block 456 according to a result of this verification. If the article of clothing is consistent with the weather condition at the device position (e.g., when the user wears a jacket and the temperature at the device position is −2° C.), it is reasonable that the user snapshot may have been actually taken where the smartphone of the user is and may likely be authentic; in this case, the snapshot validator at block 458 may extract a representation of the image features (indicated in the validation rule repository) from the user snapshot, for example, with cognitive techniques, and may save the representation of the image features into a corresponding working variable.

An exit condition of the above-described loop may now be verified at block 460. If user snapshots in further acquisition conditions are still to be acquired, the flow of activity may return to the block 422 to repeat the same operations for a next user snapshot. Conversely (once the user snapshots in all the acquisition conditions have been acquired), the loop may exit by descending into block 462. At this point, the snapshot validator may verify the representations of each image feature in the different user snapshots (extracted from the corresponding working variable). The flow of activity branches at block 464 according to a result of this verification. If the representations of each image feature are consistent throughout the user snapshots (for example, the user wears the same article of clothing, i.e., of the same type and color), all the user snapshots may have been actually taken in the same period and then in response to the corresponding snapshot requests; in this case, the identification engine at block 466 may determine a roster of persons having an affinity with the user. For this purpose, the identification ending may command the query engine to submit corresponding requests to the social networks indicated in the identification rule repository, so as to receive a list of (affine) persons from each of these social networks wherein the user is registered. For example, in each social network the affine persons are determined to have a certain level of affinity (indicated in the identification rules) with the user (e.g., persons that are direct contacts of the user, work in the same office, and the like); the roster is then defined by the affine persons that are present in the list of at least a pre-determined number of the social networks (indicated in the identification rules). The identification engine at block 468 may select the authenticators in the roster of affine persons (e.g., in pseudo-random way). The identification engine at block 470 creates a group of challenge snapshots (in a predefined number, such as 8-12). One of the challenge snapshots is of the user whereas the remaining challenge snapshots are of other persons; the identification engine may select the challenge snapshot of the user among the user snapshots (from the corresponding working variable), the challenge snapshots of the other persons among the comparison snapshots (from the corresponding repository) and an arrangement of the challenge snapshots (and particularly a position of the challenge snapshot of the user) in pseudo-random way. The identification engine at block 472 may select a pre-determined number of the personal data of the user (comprised in the reference information of the user stored in the corresponding repository) in a pseudo-random way. The identification engine at block 474 may submit an identification request to the identification app of the smartphone of each authenticator; the identification request comprises the challenge snapshots, a request of identifying the user (e.g., indicated by the user's first name) within the challenge snapshots, and a request of the selected personal data of the user.

Moving to the swim-lane of the smartphone of a generic authenticator (only one shown in the figure), in response thereto the identification app at block 476 may command the touch-screen app to display the challenge snapshots in a grid with a message requesting the authenticator to select the challenge snapshot of the user (indicated by the user's first name). Once the authenticator has selected one of the challenge snapshots, the identification app at block 478 may command the touch-screen app to display (e.g., in succession) a series of messages requesting the authenticator to enter the corresponding selected personal data of the user (e.g., user's surname). Once the authenticator has entered the requested (response) information, the identification app at block 480 may return a corresponding identification response to the identification engine; the identification response may comprise an indication of the selected challenge snapshot and the response information.

Referring back to the swim-lane of server, in the meanwhile the identification engine may enter an idle loop at block 482. If no identification response has been received, the identification engine at block 484 may verify whether a pre-determined time-out has expired (e.g., 5-10 min.). If not, the flow of activity returns to the block 482 waiting for any identification responses. Conversely, as soon as any identification response has been received (from the identification app of the smartphone of a corresponding authenticator), the identification engine at block 486 may verify it; particularly, the identification engine may verify the selected challenge snapshot against the user snapshot and the response information against the corresponding reference information (stored in the user repository). The flow of activity branches at block 488 according to a result of this verification. If the selected challenge snapshot is the user snapshot and at the same time the response information matches (i.e., it is substantially the same as) the corresponding reference information, the authenticator may correctly identify the user; in this case, the authentication engine at block 490 may verify whether a pre-determined number of the authenticators (required to ensure an acceptable degree of confidence, for example, 50-100%) have correctly identified the user. If not, the process may return to the block 482 waiting for further identification responses. Conversely, when the authenticators in the required number have correctly identified the user, the authentication engine at block 492 may authenticate the user; therefore, the service manager proceeds accordingly (e.g., by allowing the user to reset the password or by completing the registration of the user).

Referring back to the block 418, if the device position does not match the user position (e.g., when the smartphone is in Rome and the user is chatting from New York), the smartphone may not be of the user and then the authentication request may have not been submitted by the user. Referring back to the block 434, if the user snapshot does not match the sample snapshot, the user snapshot may not be of the user and then another person is trying to impersonate him/her. Referring back to the block 438, if the user snapshot does not match the corresponding acquisition condition, the user snapshot may have not been taken in response to the snapshot request and then the user snapshot may be fake. Referring back to the block 444, if the acquisition time does not follow the request time, the user snapshot may have not been taken in response to the snapshot request and then the user snapshot may likely be fake. Referring back to the block 450, if the acquisition position does not match the device position, the user snapshot may have not been taken where the smartphone of the user is and then the user snapshot may likely be fake. Referring back to the block 456, if the article of clothing is not consistent with the weather condition at the device position (e.g., the user wears a jacket when the temperature at the device position is 30° C.), there may be an implausibility that the user snapshot has been taken where the smartphone of the user is and then it is likely to be fake. Referring back to the block 464, if the representations of each image feature are not consistent throughout the user snapshots (e.g., when the user wears different articles of clothing), there may be an implausibility that the user snapshots have been all taken in the same period and then in response to the corresponding snapshot requests. In all these cases, the process may descend into block 494. The same point may also be reached from the block 484 when the time-out has expired (without the user having being identified by the pre-determined number of authenticators) or from the block 488 when an authenticator has not identified the user.

With reference now to the block 494, the authentication engine may not authenticate the user; therefore, the service manager may proceed accordingly (e.g., by blocking the account or by aborting the registration of the user). Each of the above-described verifications may further increase the reliability of the authentication (since they allow preventing, or at least substantially hindering, identity thefts).

In both cases, the method may then end at the concentric white/black stop circles 496 from the block 492 or the block 494.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, each numerical value should be read as modified by the term about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence or order. The terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment may provide a method for authenticating a user in a computing system. However, the method may be used to authenticate any user (for example, clients of a bank, customers of an e-commerce vendor, employees of a company, and the like) for any purpose (e.g., resetting passwords, registering users, authorizing operations, and the like) in any computing system (see below).

In an embodiment, the method may comprise sending by the computing system one or more snapshot requests to a user computing device of the user. However, the snapshot requests may be in any number and they may be sent in any way (e.g., with messages, notifications, remote commands, and the like) to any user computing device (e.g., smartphones, tablets, laptops and the like).

In an embodiment, the snapshot requests may be taking one or more user snapshots of the user in corresponding acquisition conditions. However, the acquisition conditions may be in any number and of any type (e.g., poses, expressions, backgrounds or any combination thereof), and they may be indicated in the snapshot requests in any way (e.g., individually or cumulatively up to all of them in a single snapshot request).

In an embodiment, the method may comprise receiving by the computing system the user snapshots from the user computing device. However, the user snapshots may be of any type (e.g., with any size, resolution, in colors or grey scale) and they may be received in any way (e.g., individually or cumulatively up to all of them together).

In an embodiment, the method may comprise validating by the computing system the user snapshots according to a match thereof with the corresponding acquisition conditions. However, the user snapshots may be validated in any way (e.g., with cognitive, fuzzy logic, artificial intelligence techniques, and the like) according to any criteria (e.g., when all the user snapshots or at least a pre-defined percentage thereof match the corresponding acquisition conditions).

In an embodiment, the method may comprise sending by the computing system corresponding identification requests to corresponding authenticator computing devices of one or more authenticators. However, the authenticators may be in any number and of any type (e.g., friends, relatives, colleagues, school mates of the user, selected automatically or indicated by the user, accepted as is or verified in some way, such as according to their positions); moreover, the authentication requests may be sent in any way (e.g., with instant messages, notifications, e-mails) to any authenticator computing devices (e.g., smartphones, tablets, laptops and the like).

In an embodiment, the authentication requests are for identifying the user according to at least part of the user snapshots. However, the authentication requests may be based in any way on any number of user snapshots (e.g., requesting to indicate the user among other persons or simply to confirm his/her identity).

In an embodiment, the method may comprise receiving by the computing system corresponding identification responses to the identification requests from the corresponding authenticator computing devices. However, the identification responses may be received in any way (e.g., in push or pull mode).

In an embodiment, the method may comprise authenticating by the computing system the user according to the identification responses. However, the user may be authenticated in any way (e.g., when the user has been identified by a pre-predefined number of authenticators with no authenticator that has not identified him/her, when the user has been identified by a pre-predefined percentage of the authenticators, when the user has been identified by all the authenticators, with any number and type of additional verifications, such as based on biometrical data, challenge phrases, codes sent by SMS and the like, down to none).

In an embodiment, the method may comprise selecting by the computing system the acquisition conditions in pseudo-random way among a plurality of candidate conditions. However, the acquisition conditions may be selected in any way among any number of candidate conditions (e.g., all different to each other, with the possibility of repetitions) or more generally they may be determined in different ways (e.g., with a round-robin policy or even fixed).

In an embodiment, the acquisition conditions may be one or more poses, expressions and/or backgrounds. However, the poses, the expressions and the backgrounds may be in any number and of any type (with different, additional or partial acquisition conditions with respect to the ones mentioned above) or more generally they may be of different type (e.g., defined by an action, an object that is hold).

In an embodiment, the method may comprise receiving by the computing system an indication of a device position of the user computing device from the user computing device. However, the device position may be defined in any way (e.g., GPS coordinates, geographical coordinates, mobile phone cell, address, and the like) and it may be received in any way (e.g., only at the beginning or for each user snapshot).

In an embodiment, the method may comprise receiving by the computing system the user snapshots associated with an indication of corresponding acquisition positions of the user snapshots from the user computing device. However, the acquisition positions may be of any type (either the same or different with respect to the device position) and they may be associated with the user snapshots in any way (e.g., in a dedicated tag, in a dedicated field of a generic tag, with a separate message either individually or cumulatively).

In an embodiment, the method may comprise validating by the computing system the user snapshots further according to a match of the corresponding acquisition positions with the device position. However, the user snapshots may be validated in any way according to the acquisition positions and the device position (e.g., when they differ by less than any threshold value, when they are in the same mobile phone cell, in the same street, and the like); in any case, this verification may also be omitted at all in a simplified implementation.

In an embodiment, the method may comprise determining by the computing system one or more articles of clothing being worn by the user from the user snapshots. However, the articles of clothing may be in any number and of any type (e.g., covering the trunk, the legs, the feet, and the like) and they may be determined in any way (e.g., with cognitive, fuzzy logic, artificial intelligence techniques, and the like).

In an embodiment, the method may comprise validating by the computing system the user snapshots further according to a consistency of the articles of clothing with an indication of a weather condition at the device position. However, the weather condition may be defined by any number and type of quantitative/qualitative parameters (e.g., temperature, snow, rain, fog, and the like) and the user snapshots may be validated in any way according to the articles of clothing and the weather condition (e.g., when all the articles of clothing or their majority are consistent with the weather condition); in any case, this verification may also be omitted at all in a simplified implementation.

In an embodiment, the method may comprise receiving by the computing system the indication of the weather condition at the device position from one or more meteorological services over a telecommunication network. However, the weather condition may be received in any way (e.g., in push or pull mode) from any number and type of meteorological services (e.g., public, private services) or more generally it may be determined in different ways (e.g., simply according to its typical values in the current season).

In an embodiment, the method may comprise receiving by the computing system an indication of a user position of the user from one or more software applications wherein the user is registered. However, the user position may be of any type (either the same or different with respect to the device position) and it may be determined in any way (e.g., with unanimity, majority, average criteria, and the like) according to any number and type of software applications (e.g., social networks, company applications, booking applications, calendars, and the like).

In an embodiment, the method may comprise authenticating by the computing system the user further according to a match of the device position with the user position. However, the user may be authenticated in any way according to the device position and the user position (e.g., when they differ by less than any threshold value, when they are in the same city, and the like); in any case, this verification may also be omitted at all in a simplified implementation.

In an embodiment, the method may comprise receiving by the computing system the user snapshots associated with an indication of corresponding acquisition times of the user snapshots from the user computing device. However, the acquisition times may be of any type (e.g., day, hour, minute) and they may be associated with the user snapshots in any way (e.g., in a dedicated tag, in a dedicated field of a generic tag, received with a separate message either individually or cumulatively).

In an embodiment, the method may comprise validating by the computing system the user snapshots further according to the acquisition time of each of the user snapshots following a request time of a corresponding one of the snapshot requests. However, the request time may be defined in any way (either the same or different with respect to the acquisition times) and the user snapshots may be validated in any way according to the acquisition times and the request times (e.g., when the acquisition times simply follow the request times, when they differ by less than any threshold value that may be fixed or increasing with the user snapshots when they are received in succession in response to a same snapshot request, and the like); in any case, this verification may also be omitted at all in a simplified implementation.

In an embodiment, the method may comprise extracting by the computing system corresponding representations of one or more image features from the user snapshots. However, the image features may be in any number and of any type (e.g., articles of clothing, landscape, sky, and the like) and their representations may be extracted from the user snapshots in any way (e.g., with cognitive, fuzzy logic, artificial intelligence techniques, and the like).

In an embodiment, the method may comprise validating by the computing system the user snapshots further according to a consistency of the representations of each of the image features throughout the user snapshots. However, the user snapshots may be validated in any way according to the representations of the image features (e.g., when the representations of each image feature are the same in all the user snapshots, in their majority, and the like).

In an embodiment, the method may comprise retrieving by the computing system an indication of a roster of persons having an affinity with the user. However, the affinity may be defined in any way (e.g., fixed or varying with the type of authentication that is requested) and it may be used to determine the roster of persons in any way (e.g., all the persons having a minimum level of affinity, a pre-determined number of persons having the highest level of affinity, and the like).

In an embodiment, the roster of persons may be retrieved from one or more software applications managing the persons. However, the software applications may be in any number and of any type, and they may be used to retrieve the roster of persons in any way (e.g., only the persons retrieved from all the software applications, from a pre-defined number thereof, from each of them, and the like).

In an embodiment, the method may comprise selecting by the computing system the authenticators within the roster of persons in a pseudo-random way. However, the authenticators may be selected in any way (e.g., in a number that is fixed or varying with the type of authentication that is requested) or more generally in different ways (e.g., with a round-robin policy).

In an embodiment, the method may comprise sending by the computing system each of the identification requests, comprising a group of challenge snapshots, to the corresponding authenticator computing device. However, the challenge snapshots may be in any number and arranged in any way (e.g., in a list, a combined image).

In an embodiment, the group of challenge snapshots may be formed by a selected user snapshot of the user snapshots and a plurality of comparison snapshots of other persons. However, the challenge snapshots may comprise any number of user snapshots mixed with any comparison snapshots (e.g., of other users of the same computing system or of generic persons selected in any way, such as in a pseudo-random way, according to similarities with the user like gender, age, hair or even pre-defined).

In an embodiment, each of the identification requests may comprise a request of identifying the selected user snapshot within the challenge snapshots. However, the identification request may be of any type (e.g., displaying the challenge snapshots in a grid and requesting the authenticators to select the user snapshot(s) within them, displaying the challenge snapshots in succession and asking the authenticators to indicate whether each of them represents the user, simply asking to identify a friend/colleague/relative without indicating his/her name, and the like).

In an embodiment, the method may comprise receiving by the computing system each of the identification responses, comprising an indication of a selected one of the challenge snapshots, from the corresponding authenticator computing device. However, the identification response may be of any type (e.g., indicating any number of selected challenge snapshots).

In an embodiment, the method may comprise identifying by the computing system the user according to a match of the selected challenge snapshot of each of the identification responses with the selected user snapshot. However, the user may be authenticated according to the selected challenge snapshots and the selected user snapshot in any way (e.g., by verifying all the selected challenge snapshots or only a pre-determined number of the first ones thereof that have been selected by each authenticator).

In an embodiment, the method may comprise sending by the computing system each of the identification requests, comprising a request for one or more personal data of the user, to the corresponding authenticator computing device. However, the personal data may be in any number and of any type (e.g., relating to names, dates, locations, events, objects, preferences or any combination thereof) and they may be requested to the authenticators in any way (together with the request of identifying the user or separately, either individually or cumulatively).

In an embodiment, the method may comprise receiving by the computing system each of the identification responses, comprising response information responsive to the request for the personal data, from the corresponding authenticator computing device. However, the response information may be received in any way (together with the identification of the user or separately, either individually or cumulatively for the different personal data).

In an embodiment, the method may comprise authenticating by the computing system the user further according to a match of the response information of each of the identification responses with reference information of the user stored in the computing system. However, the reference information may be stored in any way (e.g., locally or remotely) and the user may be authenticated according to the response information and the reference information in any way (e.g., in case of perfect match only, accepting differences of any level for a maximum number of personal data, and the like); in any case, this verification may also be omitted at all in a simplified implementation.

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

An embodiment may provide a computer program configured for causing a computing system to perform the above-described method when the computer program is executed on the computing system. An embodiment may provide a computer program product that comprises a computer readable storage medium having program instructions embodied therewith; the program instructions are executable by a computing system to cause the computing system to perform the same method. However, the computer program may be implemented as a stand-alone module, as a plug-in for a pre-existing software program (for example, the service manager), or even directly in the latter. Moreover, the computer program may be executed on any computing system (see below).

An embodiment may provide a system comprising means that are configured for performing each of the steps of the above-described method. An embodiment may provide a system comprising a circuit (i.e., any hardware suitably configured, for example, by software) for performing each of the steps of the same method. However, the system may be of any type (for example, comprising any number and type of computing machines communicating among them via any local, wide area, global, cellular or satellite network and exploiting any type of wired and/or wireless connections); moreover, the system may be implemented by physical machines, virtual machines or a static or dynamic combination thereof (for example, in a cloud computing environment). In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

Generally, similar considerations apply if the system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python programming language, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The above-described features may be combined in any way. For example, possible combination of features described above may be the following: claim 2 with claim 1, claim 3 with claim 1 or 2, claim 4 with any claim from 1 to 3, claim 5 with any claim from 1 to 4, claim 6 with claim 5, claim 7 with any claim from 1 to 6, claim 8 with any claim from 1 to 7, claim 9 with any claim from 1 to 8, claim 10 with any claim from 1 to 9, claim 11 with any claim from 1 to 10, claim 12 with any claim from 1 to 11, claim 13 with instructions for performing the method of any claim from 1 to 12, and claim 14 with means (or a circuitry) for performing each step of any claim from 1 to 12.

What is claimed is:

1. A method for authenticating a user in a computing system, wherein the method comprises:
   sending, by the computing system, one or more snapshot requests for taking one or more user snapshots of the user in corresponding a plurality of acquisition conditions to a user computing device of the user, and one or more requests for additional verification, wherein the requests for additional verification include a challenge phrase and an SMS code;
   receiving, by the computing system, the one or more user snapshots and an indication of a device position of the user computing device from the user computing device;
   determining, by the computing system, one or more articles of clothing being worn by the user from the one or more user snapshots;
   validating, by the computing system, the one or more user snapshots according to a match thereof with corresponding the plurality of acquisition conditions and a consistency of the articles of clothing within an indication of a weather condition at the device position, a validation rule repository comprised of at least one validation rule specifying one or more social networks and defining a weather condition and/or a temperature range and the articles of clothing that are worn on one or more body parts for the defined weather condition and/or temperature range, and a comparison snapshot repository which stores comparison snapshots of at least one other user of the computing system, wherein the computing system comprises a plurality of personal accounts with a service offered over the Internet, and wherein the at least one validation rule specifying the one or more social networks, and a validation rule specifying a booking application, are used to determine an acquisition position of the user;
   sending, by the computing system, corresponding one or more identification requests for identifying the user, wherein at least part of the one or more user snapshots correspond to one or more authenticator computing devices associated with one or more authenticators;
   receiving, by the computing system, corresponding one or more identification responses to the one or more identification requests from the corresponding one or more authenticator computing devices; and
   authenticating, by the computing system, the user according to the one or more identification responses.

2. The method according to claim 1, wherein the method comprises:
   selecting, by the computing system, the plurality of acquisition conditions in a pseudo-random way among a plurality of candidate conditions.

3. The method according to claim 1, wherein the selected plurality of acquisition conditions are one or more poses, expressions and/or backgrounds.

4. The method according to claim 1, wherein the method comprises:
   receiving, by the computing system, an indication of a device position of the user computing device from the user computing device;
   receiving, by the computing system, the one or more user snapshots associated with an indication of corresponding one or more acquisition positions of the one or more user snapshots from the user computing device; and
   validating, by the computing system, the one or more user snapshots further according to a match of the corresponding one or more acquisition positions with the device position.

5. The method according to claim 1, wherein the method comprises:
   receiving, by the computing system, the indication of the weather condition at the device position from one or more meteorological services over a telecommunication network.

6. The method according to claim 1, wherein the method comprises:
   receiving, by the computing system, an indication of a device position of the user computing device from the user computing device,
   receiving, by the computing system, an indication of a user position of the user from one or more software applications, wherein the user is registered, and
   authenticating, by the computing system, the user further according to a match of the device position with the user position.

7. The method according to claim 1, wherein the method comprises:
   receiving, by the computing system, the one or more user snapshots associated with an indication of corresponding one or more acquisition times of the one or more user snapshots from the user computing device; and
   validating, by the computing system, the one or more user snapshots further according to the one or more acquisition times of each of the one or more user snapshots following a request time of a corresponding one of the one or more snapshot requests.

8. The method according to claim 1, wherein the method comprises:
   extracting, by the computing system, corresponding one or more representations of one or more image features from the one or more user snapshots; and
   validating, by the computing system, the one or more user snapshots further according to a consistency of the one or more representations of each of the one or more image features throughout the one or more user snapshots.

9. The method according to claim 1, wherein the method comprises:
   retrieving, by the computing system, an indication of a roster of persons having an affinity with the user from one or more software applications managing the roster of persons; and
   selecting, by the computing system, the authenticators within the roster of persons in a pseudo-random way.

10. The method according to claim 1, wherein the method comprises:
    sending, by the computing system, each of the one or more identification requests, comprising a group of challenge snapshots, formed by a selected user snapshot of the one or more user snapshots and a plurality of comparison snapshots of one or more persons of the same computing system, and a request of identifying the selected user snapshot within the challenge snapshots, to the corresponding one or more authenticator computing devices;
    receiving, by the computing system, each of the one or more identification responses, comprising an indication of a selected one of the challenge snapshots, from the corresponding one or more authenticator computing devices; and authenticating, by the computing system, the user according to a match of the selected challenge snapshot of each of the one or more identification responses with the selected user snapshot.

11. The method according to claim 1, wherein the method comprises:

sending, by the computing system, each of the one or more identification requests, comprising a request for one or more personal data of the user, to the corresponding one or more authenticator computing devices;

receiving, by the computing system, each of the one or more identification responses, comprising response information responsive to the request for the personal data, from the corresponding one or more authenticator computing devices; and authenticating, by the computing system, the user further according to a match of the response information of each of the one or more identification responses with reference information of the user stored in the computing system.

12. A computer program product for authenticating a user in a computing system, comprising:

one or more computer-readable storage media and program instructions stored on at least one of the one or more tangible storage media, the program instructions executable by a processor to cause the processor to perform a method comprising:

sending, by the computing system, one or more snapshot requests for taking one or more user snapshots of the user in corresponding a plurality of acquisition conditions to a user computing device of the user, and one or more requests for additional verification, wherein the requests for additional verification include a challenge phrase and an SMS code;

receiving, by the computing system, the one or more user snapshots and an indication of a device position of the user computing device from the user computing device;

determining, by the computing system, one or more articles of clothing being worn by the user from the one or more user snapshots;

validating, by the computing system, the one or more user snapshots according to a match thereof with corresponding the plurality of acquisition conditions and a consistency of the articles of clothing within an indication of a weather condition at the device position, a validation rule repository comprised of at least one validation rule specifying one or more social networks and defining a weather condition and/or a temperature range and the articles of clothing that are worn on one or more body parts for the defined weather condition and/or temperature range, and a comparison snapshot repository which stores comparison snapshots of at least one other user of the computing system, wherein the computing system comprises a plurality of personal accounts with a service offered over the Internet, and wherein the at least one validation rule specifying the one or more social networks, and a validation rule specifying a booking application, are used to determine an acquisition position of the user;

sending, by the computing system, corresponding one or more identification requests for identifying the user, wherein at least part of the one or more user snapshots correspond to one or more authenticator computing devices associated with one or more authenticators;

receiving, by the computing system, corresponding one or more identification responses to the one or more identification requests from the corresponding one or more authenticator computing devices; and authenticating, by the computing system, the user according to the one or more identification responses.

13. The computer program product of claim 12, further comprising:

selecting, by the computing system, the plurality of acquisition conditions in a pseudo-random way among a plurality of candidate conditions.

14. The computer program product of claim 12, wherein the selected plurality of acquisition conditions are one or more poses, expressions and/or backgrounds.

15. The computer program product of claim 12, further comprising:

receiving, by the computing system, an indication of a device position of the user computing device from the user computing device;

receiving, by the computing system, the one or more user snapshots associated with an indication of corresponding one or more acquisition positions of the one or more user snapshots from the user computing device; and validating, by the computing system, the one or more user snapshots further according to a match of the corresponding one or more acquisition positions with the device position.

16. A computer system for authenticating a user in a computing system, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

sending, by the computing system, one or more snapshot requests for taking one or more user snapshots of the user in corresponding a plurality of acquisition conditions to a user computing device of the user, and one or more requests for additional verification, wherein the requests for additional verification include a challenge phrase and an SMS code;

receiving, by the computing system, the one or more user snapshots and an indication of a device position of the user computing device from the user computing device;

determining, by the computing system, one or more articles of clothing being worn by the user from the one or more user snapshots;

validating, by the computing system, the one or more user snapshots according to a match thereof with corresponding the plurality of acquisition conditions and a consistency of the articles of clothing within an indication of a weather condition at the device position, a validation rule repository comprised of at least one validation rule specifying one or more social networks and defining a weather condition and/or a temperature range and the articles of clothing that are worn on one or more body parts for the defined weather condition and/or temperature range, and a comparison snapshot repository which stores comparison snapshots of at least one other user of the computing system, wherein the computing system comprises a plurality of personal accounts with a service offered over the Internet, and wherein the at least one validation rule specifying the one or more social networks, and a validation rule specifying a booking application, are used to determine an acquisition position of the user;

sending, by the computing system, corresponding one or more identification requests for identifying the user, wherein at least part of the one or more user snapshots correspond to one or more authenticator computing devices associated with one or more authenticators;

receiving, by the computing system, corresponding one or more identification responses to the one or more identification requests from the corresponding one or more authenticator computing devices; and authenticating, by the computing system, the user according to the one or more identification responses.

17. The computer system of claim 16, further comprising:

receiving, by the computing system, an indication of a device position of the user computing device from the user computing device;

receiving, by the computing system, the one or more user snapshots associated with an indication of corresponding one or more acquisition positions of the one or more user snapshots from the user computing device; and validating, by the computing system, the one or more user snapshots further according to a match of the corresponding one or more acquisition positions with the device position.

* * * * *